US007182356B1

(12) United States Patent
Haase

(10) Patent No.: US 7,182,356 B1
(45) Date of Patent: Feb. 27, 2007

(54) WHEELCHAIR SECURITY SYSTEM

(76) Inventor: Stephen J. Haase, 1830 9th St., North #309, St. Petersburg, FL (US) 33704

( * ) Notice: Subject to any disclaimer, the term of this patent is extended or adjusted under 35 U.S.C. 154(b) by 473 days.

(21) Appl. No.: 10/235,432

(22) Filed: Sep. 6, 2002

(51) Int. Cl.
*B62B 7/04* (2006.01)

(52) U.S. Cl. .................................................. 280/250.1

(58) Field of Classification Search ............. 280/250.1; 297/DIG. 4
See application file for complete search history.

(56) References Cited

U.S. PATENT DOCUMENTS 4,770,432 A * 9/1988 Wagner ................... 280/250.1
4,917,395 A * 4/1990 Gabriele .................. 280/250.1
5,028,065 A * 7/1991 Danecker ................. 280/250.1
5,044,650 A * 9/1991 Eberle, Jr. ............... 280/304.1
5,290,055 A * 3/1994 Treat, Jr. ................. 280/304.1
5,634,650 A * 6/1997 Hensler et al. .......... 280/47.38
5,769,440 A * 6/1998 Jones ......................... 280/204
5,915,712 A * 6/1999 Stephenson et al. ..... 280/304.1
6,182,529 B1 * 2/2001 White ....................... 74/551.1
6,533,358 B1 * 3/2003 Avihod ....................... 297/380
6,752,414 B1 * 6/2004 Waldron et al. ............ 280/649
2003/0137420 A1 * 7/2003 Turner et al. ............ 340/572.1

OTHER PUBLICATIONS

U.S. Appl. No. 60/328,691.*
U.S. Appl. No. 60/328,836.*

* cited by examiner

*Primary Examiner*—Kevin Hurley

(57) ABSTRACT

A wheelchair security system comprises a wheelchair body fabricated of non-metallic material. The body has a pair of side portions, a backrest portion and a seat portion. Each side portion has a bearing mounting recess, a footrest, a main wheel axle mounting aperture, seat mounting holes, a handle and a seat subassembly. A pair of rectangular shaped footrest pieces are provided. Further provided is a pair of front wheels. An axle is also provided. Provided further is a pair of rear wheels. The rear wheels are coupled to the axle. Provided last is a metal detector sized to allow the passage of the wheelchair system through the passageway.

5 Claims, 2 Drawing Sheets

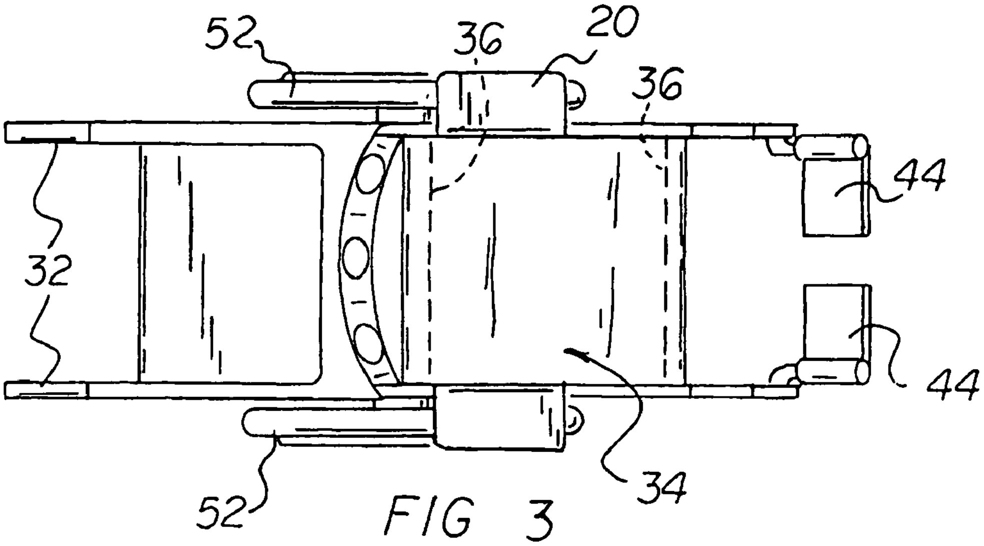
FIG 3
FIG 4
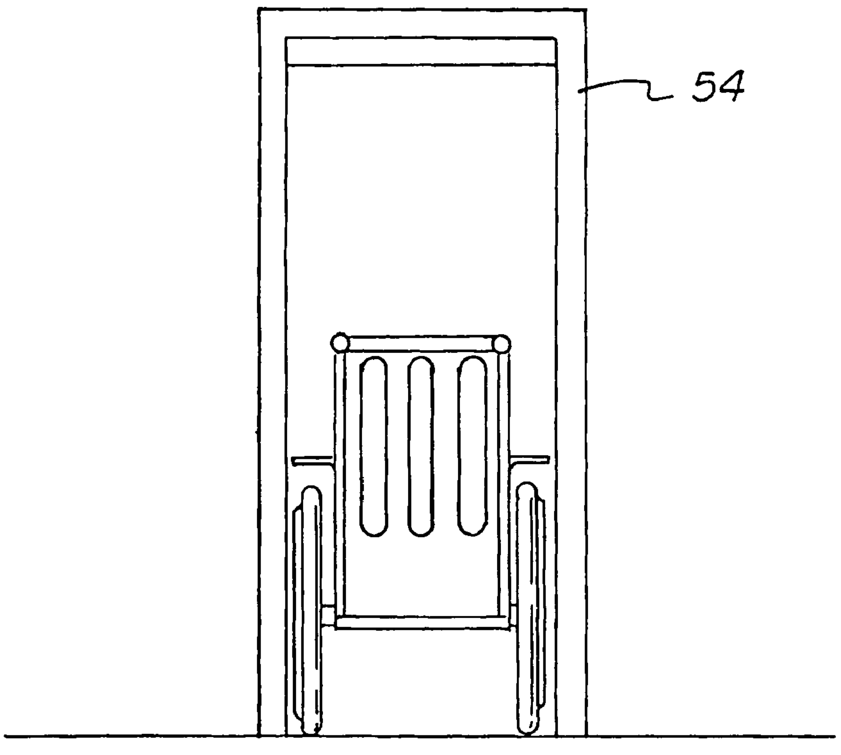

WHEELCHAIR SECURITY SYSTEM

BACKGROUND OF THE INVENTION

1. Field of the Invention

The present invention relates to a wheelchair security system and more particularly pertains to allowing a user to safely and conveniently move through a metal detecting device without the wheelchair generating a positive signal.

2. Description of the Prior Art

The use of wheelchairs of known designs and configurations is known in the prior art. More specifically, wheelchairs of known designs and configurations previously devised and utilized for the purpose of moving a user in a wheelchair through a metal detecting device are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,917,395 to Gabrielle discloses a wheelchair and method of making same. U.S. Pat. No. 4,770,432 to Wagner discloses a wheelchair. Finally, U.S. Pat. No. 5,028,065 issued to Danecker discloses a wheelchair.

While these devices fulfill their respective, particular objectives and requirements, the aforementioned patents do not describe a wheelchair security system that allows allowing a user to safely and conveniently move through a metal detecting device without the wheelchair generating a positive signal.

In this respect, the wheelchair security system according to the present invention substantially departs from the conventional concepts and designs of the prior art, and in doing so provides an apparatus primarily developed for the purpose of allowing a user to safely and conveniently move through a metal detecting device without the wheelchair generating a positive signal.

Therefore, it can be appreciated that there exists a continuing need for a new and improved wheelchair security system which can be used for allowing a user to safely and conveniently move through a metal detecting device without the wheelchair generating a positive signal. In this regard, the present invention substantially fulfills this need.

SUMMARY OF THE INVENTION

In view of the foregoing disadvantages inherent in the known types of wheelchairs of known designs and configurations now present in the prior art, the present invention provides an improved wheelchair security system. As such, the general purpose of the present invention, which will be described subsequently in greater detail, is to provide a new and improved wheelchair security system and method which has all the advantages of the prior art and none of the disadvantages.

To attain this, the present invention essentially comprises a wheelchair body. The wheelchair body is fabricated of non-metallic material. The wheelchair body has a pair of side portions. The wheelchair body has a backrest portion and a seat portion. Each of the side portions has a bend. The bend provides a right angle to form an armrest. Each side portion has a bearing mounting recess and a footrest. Each side portion further has a main wheel axle mounting aperture and a plurality of seat mounting holes. The backrest portion of the wheelchair body is fabricated of a non-metallic material in a general rectilinear configuration. The backrest portion has a bend forming a seat back. The backrest has a pair of rearwardly extending handles. The rearwardly extending handles allow a person who is pushing the wheelchair through a metal detector to be outside of the detector as an occupant of the wheelchair is being pushed through a metal detector. A seat subassembly is comprised of a plurality of round, cylindrically shaped rods. The rods are formed of a rigid non-metallic material and sized to fit into and received securely by the seat mounting holes of the side portions. A sheet-like seat portion is provided. The sheet-like portion is fabricated of a semi-flexible material with a pair of loops. The loops securely accept the rods and thereby form a seat which is suspended from the rods. Provided next is a strut. The strut is fabricated of rigid non-metallic material. The strut has a generally rectilinear configuration. The strut is coupled to the inner surfaces of the side portions. A pair of rectangular shaped footrest pieces are provided. The footrest pieces are fabricated of rigid non-metallic material. The footrest pieces are coupled to the side portions. Provided next is a pair of front wheels. Each wheel is pivotably mounted and coupled to the side portions. Also provided is a bottom brace. The bottom brace had a generally rectilinear configuration and is fabricated of rigid non-metallic material. The bottom brace is coupled to the lower inner surface of the side portions. The bottom brace projects in a rearwardly direction. An axle is provided. The axle is fabricated of a rigid non-metallic material. The axle has a round cylindrical configuration. The axle passes through the main wheel axle mounting aperture of each of the side portions. Further provided is a pair of rear wheels. The rear wheels are fabricated of rigid non-metallic material. The rear wheels are coupled to the axle. The axle has a length of between about 22 and 27 inches to space the rear wheels of the wheelchair system a distance of between about 24 and 29 inches apart to enable the wheelchair to pass through a standard 30 inch wide opening of a metal detector and an overall chair width to handle height ratio of about 13 to 17, plus or minus 5 percent. Provided last is a metal detector. The metal detector has a passageway. The passageway is sized to allow the passage of the wheelchair system through the passageway. The metal detector has a passageway. The passageway has inner dimensions of about 30 inches in width and about 80 inches in height and about 23 inches in depth. The passageway is sized to allow the passage of the wheelchair system through the passageway.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheelchair security system which has all of the advantages of the prior art wheelchairs of known designs and configurations and none of the disadvantages.

It is another object of the present invention to provide a new and improved wheelchair security system which may be easily and efficiently manufactured and marketed.

It is further an object of the present invention to provide a new and improved wheelchair security system which is of durable and reliable constructions.

An even further object of the present invention is to provide a new and improved wheelchair security system which is susceptible of a low cost of manufacture with regard to both materials and labor, and which accordingly is then susceptible of low prices of sale to the consuming public, thereby making such wheelchair security system economically available to the buying public.

Even still another object of the present invention is to provide a wheelchair security system for allowing a user to safely and conveniently move through a metal detecting device without the wheelchair generating a positive signal.

Another object of the invention is to assist security personnel in screening out potential security threats.

Lastly, it is an object of the present invention to provide a new and improved wheelchair security system comprises a wheelchair body fabricated of non-metallic material. The body has a pair of side portions, a backrest portion and a seat portion. Each side portion has a bearing mounting recess, a footrest, a main wheel axle mounting aperture, seat mounting holes, a handle and a seat subassembly. A pair of rectangular shaped footrest pieces are provided. Further provided is a pair of front wheels. An axle is also provided. Provided further is a pair of rear wheels. The rear wheels are coupled to the axle. Provided last is a metal detector sized to allow the passage of the wheelchair system through the passageway.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top plan view of the system shown in FIGS. 1 and 2, taken along line 3—3 of FIG. 2.

FIG. 4 is a rear elevational view illustrating the wheelchair rolling through a metal detector.

The same reference numerals refer to the same parts throughout the various Figures.

DESCRIPTION OF THE PREFERRED EMBODIMENT

Figure 1:
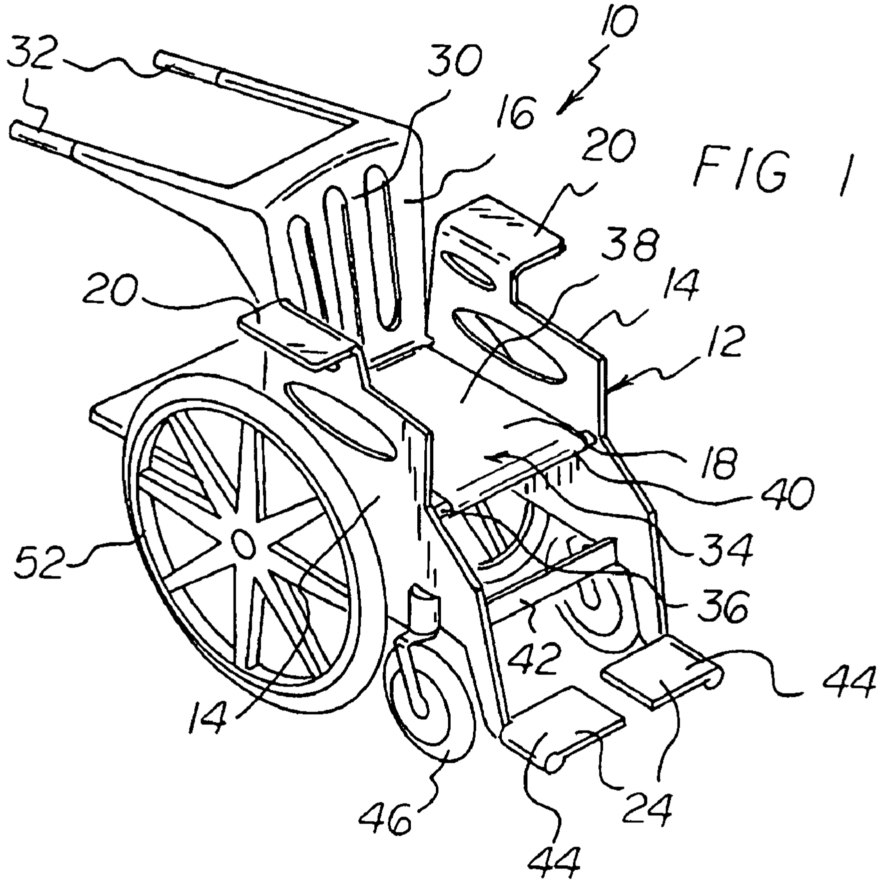
FIG. 1 is a perspective view of a wheelchair security system constructed in accordance with the principles of the present invention.
Figure 2:
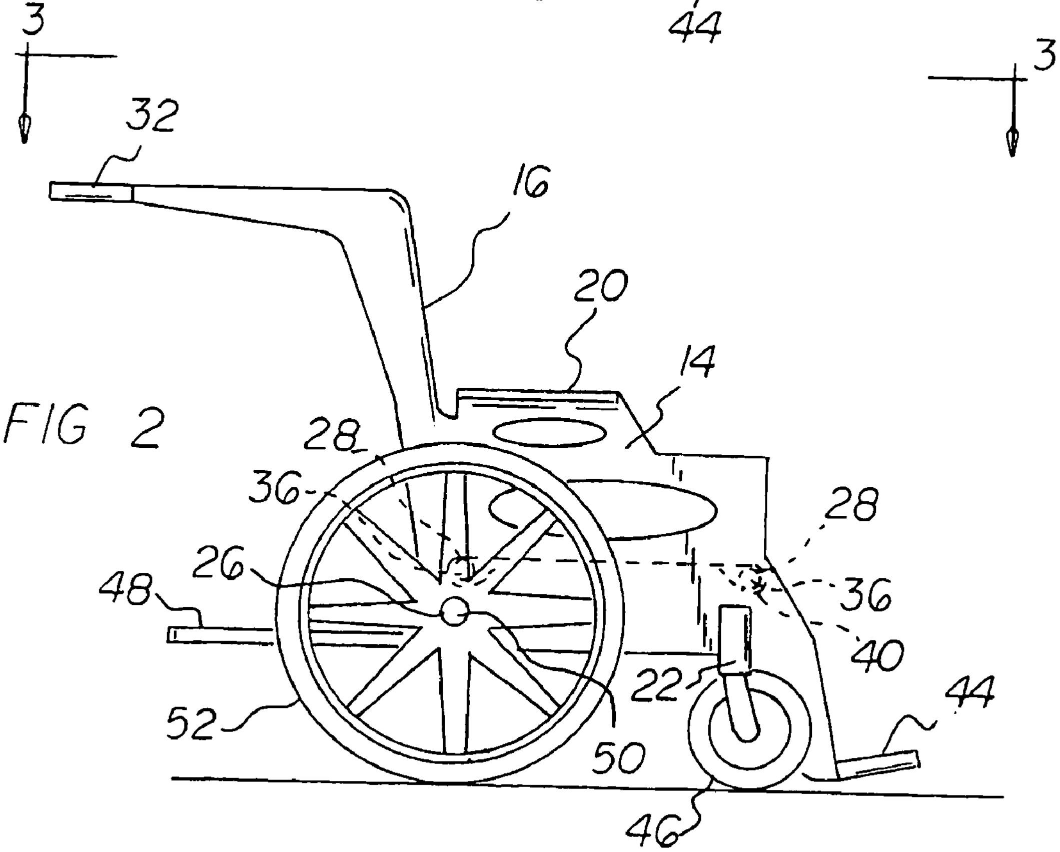
FIG. 2 is a side elevational view of the system shown in FIG. 1.

With reference now to the drawings, and in particular to FIG. 1 thereof, the preferred embodiment of the new and improved wheelchair security system embodying the principles and concepts of the present invention and generally designated by the reference numeral 10 will be described.

The present invention, the wheelchair security system 10 is comprised of a plurality of components. Such components in their broadest context include a wheelchair body, a part if rectangular shaped footrest pieces, a pair of non-metallic front wheels, an axle, a pair of rear wheels, and a metal detector. Such components are individually configured and correlated with respect to each other so as to attain the desired objective.

First provided is a wheelchair body 12. The wheelchair body is fabricated of non-metallic material. The wheelchair body has a pair of side portions 14. The wheelchair body has a backrest portion 16 and a seat portion 18. Each of the side portions has a bend. The bend provides a right angle to form an armrest 20. Each side portion has a bearing mounting recess 22 and a footrest 24. Each side portion further has a main wheel axle mounting aperture 26 and a plurality of seat mounting holes 28. The backrest portion of the wheelchair body is fabricated of a non-metallic material in a general rectilinear configuration. The backrest portion has a bend forming a seat back 30. The backrest has a pair of rearwardly extending handles 32. The rearwardly extending handles allow a person who is pushing the wheelchair through a metal detector to be outside of the detector as an occupant of the wheelchair is being pushed through a metal detector.

A seat subassembly 34 is comprised of a plurality of round, cylindrically shaped rods 36. The rods are formed of a rigid non-metallic material and sized to fit into and received securely by the seat mounting holes of the side portions. A sheet-like seat portion 38 is provided. The sheet-like portion is fabricated of a semi-flexible material with a pair of loops 40. The loops securely accept the rods and thereby form a seat which is suspended from the rods.

Provided next is a strut 42. The strut is fabricated of rigid non-metallic material. The strut has a generally rectilinear configuration. The strut is coupled to the inner surfaces of the side portions.

A pair of rectangular shaped footrest pieces 44 are provided. The footrest pieces are fabricated of rigid non-metallic material. The footrest pieces are coupled to the side portions.

Provided next is a pair of non-metallic front wheels 46. Each wheel is rotatable, pivotably mounted and coupled to the side portions.

Also provided is a bottom brace 48. The bottom brace had a generally rectilinear configuration and is fabricated of rigid non-metallic material. The bottom brace is coupled to the lower inner surface of the side portions. The bottom brace projects in a rearwardly direction.

An axle 50 is provided. The axle is fabricated of a rigid non-metallic material. The axle has a round cylindrical configuration. The axle passes through the main wheel axle mounting aperture of each of the side portions.

Further provided is a pair of rear wheels 52. The handles 32 are located above and rearwardly of the wheels 52. The rear wheels are fabricated of rigid non-metallic material. The rear wheels are coupled to the axle. The axle has a length of between about 22 and 27 inches to space the rear wheels of the wheelchair system a distance of between about 24 and 29 inches apart to enable the wheelchair to pass through a standard 30 inch wide opening of a metal detector and an overall chair width to handle height ratio of about 13 to 17, plus or minus 5 percent.

Provided last is a metal detector 54. The metal detector has a passageway. The passageway is sized to allow the passage of the wheelchair system through the passageway. The metal detector has a passageway. The passageway has inner dimensions of about 30 inches in width and about 80 inches in height and about 23 inches in depth. The passageway is sized to allow the passage of the wheelchair system through the passageway.

The present invention includes a wheelchair fabricated from any of a plurality of non-metallic materials. As for example, the wheels and handles are preferably fabricated of rubber, natural or synthetic, or blends thereof. The seat, and where desired, an associated belt, are preferably fabricated of fibers, either natural, such as letter, or synthetic, such as plastic, nylon or vinyl, preferably in a woven form. Lastly, the remaining components of the wheelchair are preferably fabricated of a rigid material, as for example, plastic such as polyvinyl chloride, PVC, or in the alternative, a composite material including fibers within a matrix binder, as for example fiberglass.

The wheelchair of this invention is fabricated of non-metallic materials. It is intended to be used at all security checkpoints, i.e., airports, courthouses and other governmental and/or private buildings. This invention allows security authorities to expedite the security process by having all patrons, including those confined to wheelchairs, go through the same, more consistent archway metal detectors at the facilities. The wheelchair will be in the control of the authorities conducting the search. A parties would transfer from his/her wheelchair to the non-metallic chair and be wheeled by a security officer through the metal detector archway.

This invention allows for the overall security process to be improved and made more consistent. No special pat downs or less efficient metal detector wands are necessary with this invention unless the patron fails access when passed through the metal detector archway. Also, the invention allows the patron's regular wheelchair to be fully inspected by authorities. In the past, some things would be passed off as being a "hit" only because the wheelchair is made of metallic parts. As such, the present invention makes it more convenient for security guards to detect metal objects to thereby keep such objects off of aircraft or other secured areas objects which pose a threat to security.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheelchair security system for allowing a user to safely and conveniently to be moved through a metal detecting device without the wheelchair generating a positive signal comprising, in combination:

a wheelchair body fabricated of non-metallic material having a pair of side portions and a backrest portion and a seat portion, with each of the side portions having a bend thereby providing a right angle to form an armrest, with each side portion having a bearing mounting recess and a footrest and a main wheel axle mounting aperture and a plurality of seat mounting holes, with the backrest portion of the wheelchair body fabricated of a non-metallic material in a general rectilinear configuration and having a bend forming a seat back, the backrest having a pair of rearwardly extending handles to allow a person who is pushing the wheelchair through a metal detector to be outside of the detector as an occupant of the wheelchair is being pushed through a metal detector, the handles constituting the rearward most components of the system;

a seat subassembly comprising a plurality of round, cylindrically shaped rods fabricated of a rigid non-metallic material and sized to fit into and received securely by the seat mounting holes of the side portions, and a sheet-like seat portion fabricated of a semi-flexible material with a pair of loops to securely accept the rods and thereby form a seat which is suspended from the rods;

a strut fabricated of rigid non-metallic material having a generally rectilinear configuration coupled to the inner surfaces of the side portions;

a pair of rectangular shaped footrest pieces fabricated of rigid non-metallic material and coupled to the side portions;

a bottom brace having a generally rectilinear configuration and fabricated of rigid non-metallic material coupled to the lower inner surface of the side portions and projecting in a rearwardly direction;

an axle fabricated of a rigid non-metallic material and having a round cylindrical configuration and passing through the main wheel axle mounting aperture of each of the side portions;

a pair of rear wheels fabricated of rigid non-metallic material coupled to the axle, the axle having a length of between about 22 and 27 inches to space the rear wheels of the wheelchair system a distance of between about 24 and 29 inches apart to enable the wheelchair to pass through a standard 30 inch wide opening of a metal detector, and with an overall chair width to handle height ratio of about 13 to 17, plus or minus 5 percent, the wheels being entirely located forward of the handles; and a metal detector having a passageway sized to allow the passage of the wheelchair system through the passageway, the metal detector having a passageway with inner dimensions of about 30 inches in width and about 80 inches in height and about 23 inches in depth and sized to allow the passage of the wheelchair system through the passageway.

2. A metal detector and wheelchair security system for allowing a user to safely and conveniently be moved through a metal detecting device without the wheelchair generating a positive signal comprising:

a wheelchair body fabricated of non-metallic material having a pair of side portions and a backrest portion and a seat portion, with each side portion having a bearing mounting recess and a footrest and a main wheel axle mounting aperture and a plurality of seat mounting holes and a seat subassembly, the backrest portion having a pair of rearwardly extending handles to allow a person who is pushing the wheelchair through a metal detector to be outside of the detector as the wheelchair is being pushed through a metal detector, the handles constituting the rearward most components of the system;

a pair of rectangular shaped footrest pieces fabricated of rigid non-metallic material;

a pair of non-metallic front wheels;

an axle fabricated of a rigid non-metallic material;

a pair of rear wheels fabricated of rigid non-metallic material coupled to the axle, the handles being located above, and entirely rearwardly of, the rear wheels; and a metal detector sized to allow the passage of the wheelchair system through the passageway.

3. A system as set forth in claim 2 wherein the axle has a length of between about 22 and 27 inches to space the rear wheels of the wheelchair system a distance of between about 24 and 29 inches apart to enable the wheelchair to pass through a standard 30 inch wide opening of a metal detector.

4. A system as set forth in claim 2 wherein the metal detector has a passageway with inner dimensions of about 30 inches in width and about 80 inches in height and about 23 inches in depth and sized to allow the passage of the wheelchair system through the passageway.

5. A system as set forth in claim 2 wherein the overall chair width to handle height ratio is about 13 to 17, plus or minus 5 percent.

* * * * *